United States Patent [19]

Garrett et al.

[11] 3,970,177

[45] July 20, 1976

[54] HYDRAULIC RELEASE MECHANISM FOR CLUTCHES

[75] Inventors: Roy Peter Garrett, Gothenburg, Sweden; Derek Ray Parkins, Barton, England

[73] Assignee: SKF Trading and Development Co. B.V., Amsterdam, Netherlands

[22] Filed: Nov. 26, 1974

[21] Appl. No.: 527,357

Related U.S. Application Data

[63] Continuation-in-part of Ser. No. 349,456, April 9, 1973, abandoned.

[30] Foreign Application Priority Data

Apr. 13, 1971 United Kingdom.................. 9244/71
Sept. 3, 1971 United Kingdom................ 41245/71
Apr. 13, 1972 Germany............................ 2217942

[52] U.S. Cl. .......................... 192/91 A; 192/85 CA; 192/109 A; 192/110 B; 92/DIG. 1
[51] Int. Cl.² .......................................... F16D 25/08
[58] Field of Search ......................... 92/116, DIG. 1; 192/85 CA, 91 A, 98, 110 B, 82 T, 109 A

[56] References Cited
UNITED STATES PATENTS

| 2,402,979 | 7/1946 | Barto | 92/116 X |
|---|---|---|---|
| 2,674,461 | 4/1954 | Gamet | 92/116 |
| 2,822,667 | 2/1958 | Drexel | 192/85 CA |
| 3,283,866 | 11/1966 | Giacosa | 192/96 |

FOREIGN PATENTS OR APPLICATIONS 531,046   12/1940   United Kingdom................... 192/98

*Primary Examiner*—Benjamin W. Wyche
*Attorney, Agent, or Firm*—Murray Schaffer

[57] ABSTRACT

A hydraulic release mechanism for automobile clutches comprising a housing open at one end and a bearing. The bearing comprises a rotating race ring adapted to be connected to the operating member of the clutch, a non-rotating race ring and a plurality of rolling elements located therebetween. The non-rotating race ring is slidably arranged with respect to the housing, and seal means is arranged between the housing and the axial frontal end of the non-rotating race ring to enclose space between the sliding surfaces while permitting the race ring to move on introduction of pressurized fluid into the housing.

9 Claims, 2 Drawing Figures

HYDRAULIC RELEASE MECHANISM FOR CLUTCHES

RELATED APPLICATION

The present application is a continuation-in-part of Ser. No. 349,456, filed Apr. 9, 1973, and now abandoned in which one Heinz Kiener was also named co-inventor; the present application is limited to the invention shown in FIGs. 3 and 4 of that application, although reference to the entire disclosure may be made as if set forth herein.

BACKGROUND OF INVENTION

The present invention related to a hydraulic release mechanism for clutches particularly for automobiles and similar motor vehicles.

A hydraulic release mechanism is known from German patent publication DOS2,003,253. An advantage of the release mechanism when applied to a clutch arises from the fact that it may be formed as an entire assembly which can be secured by means of an annular flange on the clutch or on the transmission housing of the vehicle. In particular instances however the known release mechanism has certain disadvantages. In the known construction, the release mechanism comprises a cylindrical housing in which a bearing comprising an inner and outer ring is located. According to this construction the inner ring of the release mechanism is extended to form a piston which is axially slidable in the cylinder housing. As a result it is necessary to have an inordinate amount of room in the axial direction in order to accommodate the movement of the inner ring piston. As a result it is very difficult to employ the known release mechanism in many motor vehicles which have limited space and in particular in those motor vehicles wherein the clutch and the transmission are set transversely to each other.

The present invention has as its object the production of a hydraulic release mechanism for motor vehicle clutches which overcomes the disadvantages of the prior art and which provides a compact inexpensive unit requiring very little space in the axial direction.

It is a further object of the present invention to provide a hydraulic release mechanism which may be universally used in motor vehicles and even with those employing motors mounted in the direction of travel.

Further objects as well as advantages of the present invention are set forth within the body of the following disclosure of the preferred forms of the present invention.

SUMMARY OF INVENTION

According to the present invention a hydraulic release mechanism for the clutches of automobiles and similar vehicles is provided which comprises a housing open at one end and a bearing located therein. The bearing comprises a rotating race ring adapted to be connected to the operating member of the clutch through the open end of the housing, a non-rotating race ring and a plurality of rolling elements located between the races. The non-rotating race ring is slidably arranged with respect to the housing. Slidable seal means secured to the piston is interposed between the frontal face of the non-rotating race ring and the housing to seal against fluid flow axially through the space between the sliding surfaces permitting the race ring to move with respect to the housing on introduction of pressurized fluid into the housing. As a result of this construction the hydraulic release force for shifting the clutch, is transmitted over the non-rotating bearing ring, the rolling elements, and the rotating bearing ring directly to the operating element for release of the clutch.

An advantage of the present invention lies in the fact that the entire bearing is slidable, as a piston in the housing. Since the operating element of the clutch is directly connected to the rotating race ring the space required for the entire release mechanism, in the axial direction is extremely small. Furthermore, the bearing of the release mechanism can be precisely driven within the housing since the non-rotating race member is employed as the piston element as opposed to the prior art constructions.

It is preferred that the open side of the housing, i.e. the side through which the operating element of the clutch passes, is closed by a cover member or disc located on the end of the non-rotating race ring remote from the clutch operating element. This cover disc defines with the housing a chamber in which the pressurized fluid may be introduced, the cover disc itself forming the piston head of the release bearing. The bearing itself may be formed as a normal radial, or angular contact bearing. The inner race ring can be provided with a bore into which the operating element can be removably secured or with which it can be integrally and unitarily formed as one piece.

A further advantage of the present invention lies in the fact that the operating element can be formed by a thin walled cup-shaped cover member which may be easily formed without the necessity of machining or cutting metal parts. It is also possible that the aforementioned cover disc located on the outer or non-rotating race ring can be also formed of a thin-walled non-machined member which may be secured to or integrally made with the outer ring.

In a further embodiment, the operating element may be secured in or on the inner ring by an intermediate elastic sleeve which resiliently urges the operating element in proper alignment between the release bearing and the clutch. Thus, during operation of the device any misalignment between the release bearing and the clutch can be automatically removed on the urging of the elastic sleeve.

Full details of the present invention are given in the following description of its preferred embodiments, and in the accompanying drawings.

Before turning to the present invention reference is made to co-pending application, Ser. No. 349,298 filed on even date hereof corresponding to German application No. P 22 17 943.7 filed on Apr. 13, 1972 and assigned to the assignee of the present invention in which a hydraulic release mechanism is shown where the non-rotating race ring is slidable but has no play. Reference may be made to the co-pending application as if that application were more fully set forth herein.

DESCRIPTION OF INVENTION

Figure 1:
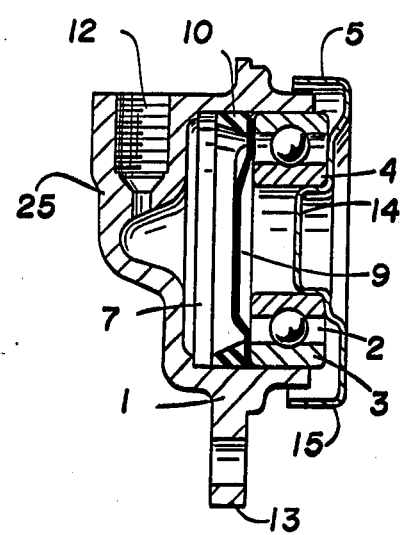
FIG. 1 is a sectional view axially through a clutch release mechanism formed in accordance with the present invention.

The release mechanism shown in FIG. 1 comprises a housing 1 having a generally cylindrical bore, closed at its bottom or rear end to form a cup-shaped member. A release bearing generally depicted by the numeral 2 is set within the housing. The release bearing comprises a cylindrical outer ring 3 of slightly smaller outer diameter than the inner diameter of the housing 1 so that it slides axially within the housing with only a small amount of play. The release bearing 2 also includes an inner ring 4 into the bore of which is press fit a release element 5 connected to a not shown clutch. An open area 7 is formed between the bottom of the housing 1 and the edge of the outer ring 3. A plurality of rolling elements 8 are arranged between the race surfaces of the inner ring and outer ring which are formed with cooperating grooved surfaces acting on the rolling elements. A cover member in the form of a disc 9 is located within the body of the housing covering the central bore of the release bearing 2. The disc 9 is spaced from the bottom wall of the housing 1 to enclose the area 7 and thus form a closed chamber in which pressurized fluid may be received. A slidable annular seal ring 10 which is bonded to disc 9 is provided to seal the gap between the outer race ring 3 and the housing 1 so that the chamber 7 is fluid tight. A tap hole 12 extends radially through the cylindrical housing 1 into the chamber 7. The tap hole 12 is adapted to be connected by suitable conduit means to a source of fluid under pressure (not shown) and which is provided with suitable control and valve means as is known in this art. Lastly, the housing 1 is provided with a radially extending flange 13 by which it may be fastened by suitable bolts, screws or other means to either the clutch body or transmission housing.

Operatively the release mechanism shown in FIG. 1 is such that the operating element engaging with the clutch is fastened to the rotating inner race ring while the outer race ring is non-rotating with respect to the housing 1. The outer race ring 3 is however slidable under the action of the pressurized fluid entering the chamber 7 so as to cause the axial movement of the entire bearing, when desired and thus the direct and instantaneous movement of the operating element 5.

The described hydraulic release mechanism is particularly adaptable for use in friction clutches for automobiles whose motor and transmission are transversely installed with respect to the direction of travel and wherein very little room is provided in the axial direction. The cylindrical housing 1 can thereby be secured to the transmission housing. With this construction the release mechanism can be quickly and easily changed even under emergency situations. In order to release or shift the clutch, a pressure is fed to the chamber 7, which pressure is urged against the disc 9, moving the entire bearing assembly and the operating element to the right as seen in FIG. 1. The outer end of the operating element may be connected to a pressure plate by which means the disconnection of the clutch discs or comparable thrust plates may be effected.

The release bearing 2 comprises a conventional radial bearing having grooved race surfaces. The outer housing 1 is modified in shape to have not only a cylindrical portion in which the bearing 2 is located but also an integrally formed shaped enclosing end 25 having a thickened portion through which is a tap hole 12.

The bearing 2 as shown in FIG. 1 comprises a cylindrical outer race ring 3 which has an outer diameter slightly less than the inner diameter of the cylindrical portion of the housing 1 so that it slides with respect to it. The disc like cover member 9 abuts against the inner end of the outer race ring 3 and is held securely by the annular seal ring 10 to seal the inner area between the surfaces of the housing and the slidable race ring and form the chamber 7. The cover member 9 may not be integrally formed with the outer race ring but may be separable therefrom and is preferably made from sheet metal which is simply and easily pressed or stamped without machine working into the desired shape. The cover member 9 and the seal ring 10 enclose the chamber 7 from leakage or loss of fluid axially outward of the open end of the housing 1. The seal ring 10 acts further to seal the housing and the outer race ring against the loss of fluid through the space necessary to permit the relative axial sliding of the outer race ring. The cylinder housing can be conventionally made by molding, casting or machining and is provided with a flange 13 by which it may be connected either to the clutch or to the transmission housing.

The operating element 5 is made from a thin walled cup-shaped member made by stamping, pressing or other non-machined or non-cutting technique. The operating element 5 is formed with a central shank portion 14 which is press fit or otherwise secured within the bore of the inner race ring 4 so as to be conjointly movable with it.

On the introduction of pressure medium through the tap 12 into the chamber 7, the entire assembly of the bearing 2 is urged to the right by the action of the pressurized medium against the cover member 9. As a result the operating element 5 is instantaneously and directly moved to the right as seen in the Figure so that this operating element can engage with the release lever of the clutch and force it to effect a disengagement of the clutch discs in the known manner.

Figure 2:
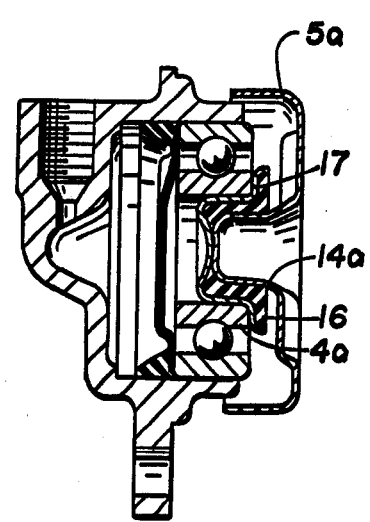
FIG. 2 is a view similar to FIG. 1 showing a second embodiment to the present invention.

Still another embodiment is shown in FIG. 2. In this embodiment the housing and bearing are essentially the same as that shown in FIG. 1 and further description of these are not necessary. The embodiment of FIG. 2 distinguishes from that in FIG. 1 with regard to the shape of the clutch operating element 5 and the provision of an intermediate structure between it and the inner race ring 4. As in FIG. 1, here the operating element 5a is a simply formed member made from sheet metal or the like which is thin walled and cup shaped. The member 5a is provided with an elongated central shank 14a which unlike that of the embodiment of FIG. 1 has a smaller diameter so that it does not itself engage with the bore of the inner race ring 4a. Instead, there is located between the shank 14a and the inner race ring 4a a bowl-shaped intermediate insert which is formed of an elastic sleeve 16 surrounded by a cup-shaped sheet metal outer cover 17. The cup-shaped outer cover 17 is press fit securely within the bore of the inner race ring 4a while the elastic sleeve 16 conforms to and graspingly engages the outer surface of the shank 14a of the operating element 5a so that a secure connection is made between the inner race ring 4a and the operating element 5a for conjoint movement as in the previous embodiments. In the embodiment of FIG. 2 however, because of the elasticity of the sleeve 16 radial and angular deflection of the operating element 5a is possible. In this way the operating element 5a can be and is automatically self-centering along the central axis of rotation even through vibration and relative movement of the vehicle parts may induce mementary deflection. This is particularly advantageous should any misalignment occur during operation between the coupling and the release element 5a.

It will be seen from the foregoing that various embodiments are provided in which a hydraulic release mechanism for clutches, particularly for clutches used in motor vehicles, is simply and easily formed and which have multiple uses and advantages. The release mechanism in each embodiment is such that the hydraulic release force is transmitted unlike the prior art, over the non-rotating bearing race ring, via the rolling elements, to the rotating bearing race ring on which or to which the release element of the clutch element is secured. In this manner the release mechanism is compactly made and takes up only a very small axial space. Furthermore, the entire arrangement can be made as a unit which may be directly secured to the clutch or the transmission housing as desired. Particularly the construction as shown can be used in those vehicles wherein the motor and the transmission are installed tranversely to the direction of travel. In such instances the clutch can be operated by either the operating element 5 engaging directly with the clutch member itself or by a connecting rod extending from the inner ring 4 through the transmission to the clutch member. It will also be seen that the release mechanism of the present invention is adaptable both for the pull or draw type clutches as well as for the push type clutches. The present invention may also be used in connection with the more conventional construction of motor vehicles wherein the clutch is arranged between the motor and the transmission so that the drive shaft is driven extendingly through the clutch and the release mechanism.

Only a very minor and insignificant modification of the structures shown and described above need be made, without departing from the scope and framework of the present invention. For example, in FIG. 1, the shank 14 of the operating element 5, the disc 9 and the opposed wall of the cylinder 1 can be simply made with a bore through which would extend the shaft. Suitable seal means can be arranged about the shaft sealing the same against loss of fluid and maintaining the hydraulic nature of the bearing without departing from the form and type of operation previously described. If also desired, the present invention provides a release mechanism which is particularly adapted for motors which are transversely installed. The drive moment can be transmitted from the clutches laterally to a transmission which is arranged under or near the motor. For such a construction the release mechanisms as shown can be used without any modification.

Various modifications, changes and embodiments have been shown in the present disclosure. The present disclosure is intended to be illustrative only of the present invention and not to be limiting of its scope in any manner.

What is claimed is:

1. A hydraulic release mechanism for automobile clutches and the like comprising a housing open at one end, a bearing located within said housing comprising a rotating race ring adapted to be connected to the operating member of said clutch, a non-rotating race ring and a plurality of rolling elements located therebetween, said non-rotating race ring being slidably arranged with respect to the housing, and including slidable seal means enclosing the space between the housing and the non-rotating race ring to permit said race ring to slide on introduction of pressurized fluid into said housing without loss of fluid, said rotating ring being the inner ring of said bearing and said operating element is a thin walled cup-shaped member secured to the inner race ring and covering the open end of the bearing and the release mechanism.

2. The release mechanism according to claim 1 wherein said seal means is located adjacent the axial frontal end of said non-rotating race ring and slidably engages the surface of said housing.

3. The hydraulic release mechanism according to claim 1 wherein the housing and the non-rotating race ring are cylindrical and said non-rotating race ring comprises the outer race of the bearing.

4. The release mechanism according to claim 1 wherein the non-rotating race ring is provided with a cover disc at its frontal end within the housing defining an enclosed chamber with the walls of the housing.

5. The release bearing according to claim 4 wherein said cover disc is located between the frontal end of said non-rotating race ring and said slidable seal means.

6. The release mechanism according to claim 4 wherein the cover disc and the non-rotating race ring are separable.

7. The release mechanism according to claim 1 wherein the rotating race ring is the inner ring of said bearing and wherein the clutch operating element is secured to the inner race ring.

8. The release mechanism according to claim 1 wherein the inner race ring is integrally formed with the clutch operating element.

9. The release mechanism according to claim 1 including an intermediate elastic sleeve arranged between the operating element and the rotating race ring.

* * * * *